ADJUSTABLE WINDOW GRILLE WITH COLLAPSIBLE BOTTOM GUARD BARS

Original Filed Aug. 5, 1964 2 Sheets-Sheet 1

INVENTOR.
Albert Udin
BY Polachek & Saulsbury
ATTORNEYS.

ADJUSTABLE WINDOW GRILLE WITH COLLAPSIBLE BOTTOM GUARD BARS
Original Filed Aug. 5, 1964 2 Sheets-Sheet 2
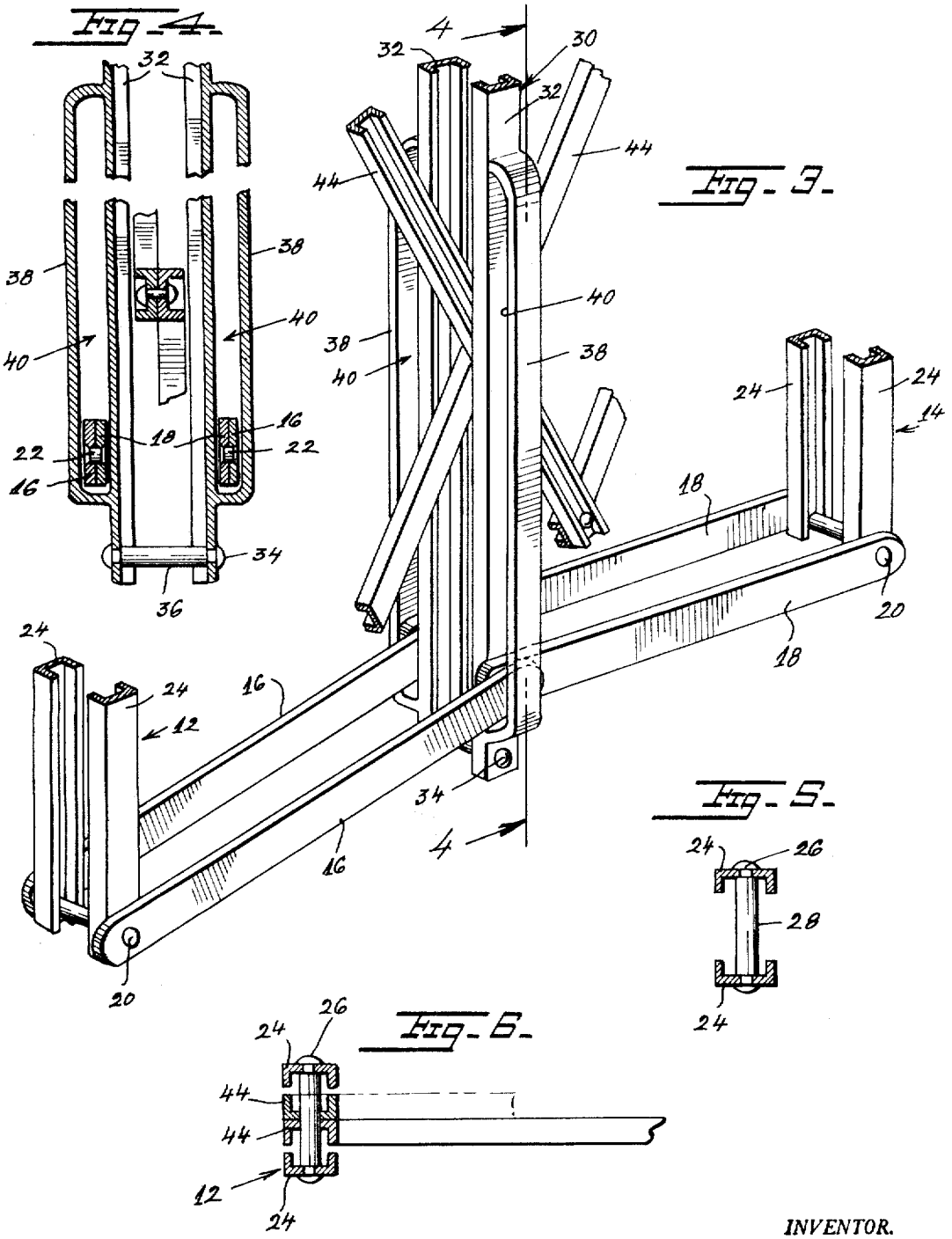
INVENTOR.
Albert Udin
BY
Polachek & Saulsbury
ATTORNEYS.

United States Patent Office

Re. 26,259
Reissued Aug. 29, 1967

26,259

ADJUSTABLE WINDOW GRILLE WITH COLLAPSIBLE BOTTOM GUARD BARS

Albert Udin, 4236 Park Ave., Bronx, N.Y. 10457

Original No. 3,258,061, dated June 28, 1966, Ser. No. 387,566, Aug. 5, 1964. Application for reissue Nov. 22, 1966, Ser. No. 598,587

2 Claims. (Cl. 160—161)

Matter enclosed in heavy brackets [ ] appears in the original patent but forms no part of this reissue specification; matter printed in italics indicates the additions made by reissue.

*ABSTRACT OF THE DISCLOSURE*

*An adjustable grille with collapsible bottom guard bars, including a plurality of members interconnected in lazy-tong fashion between vertical stiles, the bottom guard bars being interconnected at the bottom of at least one of the stiles to lie in horizontal position at the bottom of the lazy-tong members when the grille is in extended condition, and which pivots upwardly when the grille is collapsed. In the horizontal position, the guard bars prevent access to the lower portions of the lazy-tong members, and thereby prevent the forcing of the same.*

This invention relates to adjustable grilles for serving as guards in connection with rear openings in trucks, doors, windows and similar openings, particularly wherein said grille is adjustable within limits to the length thereof.

The primary object of the present invention is to economically produce a grille of this kind which is adjustable while having qualities present in a fixed grille, such as vertical bars mounted in conjunction with the grille structure.

A further object is to provide a grille of this kind with means to prevent tampering with the movable grille members at the bottom thereof.

Another object is to provide a collapsible grille construction of the lazy tong type which is readily extensible and collapsible and when collapsed may be positioned in a space greatly reduced from the space originally occupied when extended so that the collapsed grille may be compactly positioned immediately adjacent the side of the opening in a relative unobstructive, obscure manner.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Figure 1:
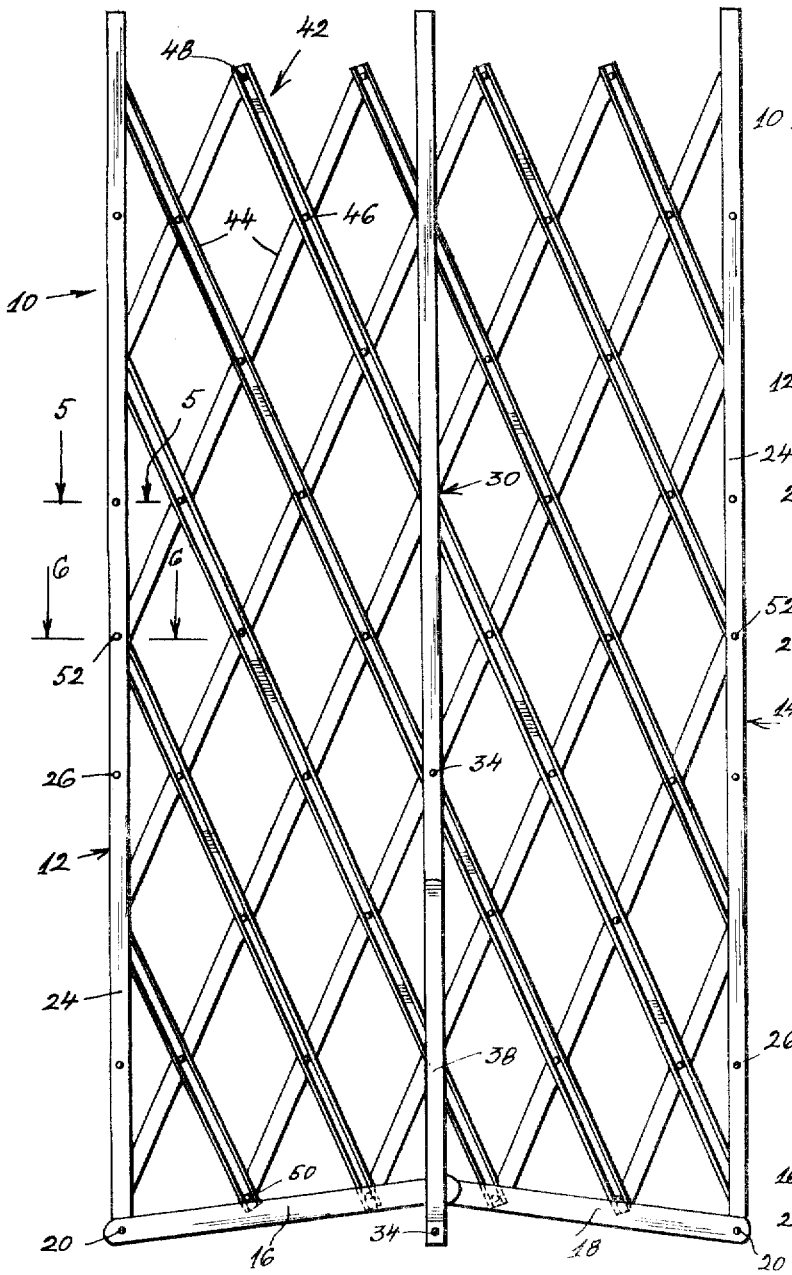
FIGURE 1 is a view in front elevation of the grille in extended position.

FIGURE 3 is an enlarged fragmentary perspective front view of the bottom end of the grille, parts being shown broken away, FIGURE 4 is a vertical sectional view taken on the line 4—4 of FIG. 3, parts being broken away, FIGURE 5 is an enlarged horizontal sectional view taken on the line 5—5 of FIG. 1, and FIGURE 6 is a similar view taken on the line 6—6 of FIG. 1.

Referring now in detail to the various views of the drawings wherein similar parts are indicated by similar reference numerals, in FIG. 1 there is shown an adjustable grille embodying the invention and designated generally at 10. The grille comprises a framework including side frame members in the form of vertical stiles 12 and 14 and bottom end pivotal frame members in the form of pairs of straight flat metal links 16, 16 and 18, 18, pivotally connected at one end to the stiles 12 and 14, by means of pivot pins 20, the other ends of the links 16 and 18 being overlapped with overlapped ends pivotally connected by a pivot pin 22, the pivot pin 22 being disposed above the plane of the pivot pins 20 as shown in FIGS. 1 and 3.

Each stile 12 and 14 preferably comprises a pair of channel irons which have their side flanges directed towards each other. The channel irons 24 are held together by rivets 26 and are maintained in spaced relation by spacer sleeves 28 through which the rivets extend.

Midway in the space between the side stiles 12 and 14, there is a central stile 30 which comprises a pair of opposed channel irons which have their side flanges directed towards each other. The channel irons 32 are held together by rivets 34 and are maintained in spaced relation by spacer sleeves 36 through which the rivets extend. At the bottom end, each channel iron 32 is formed integrally with a short guide bar 38 closely spaced from the body of the channel iron and extending from a point slightly above the bottom of the channel iron to a point thereabove and remote therefrom and being turned inwardly at the top and bottom thereof, the guide bar 38 and body of the channel iron constituting a trackway 40 for guiding the sliding movement of the overlapped ends of the links 16 and 18.

A horizontal extensible unit indicated generally at 42 is interposed between the side stiles 12 and 14 and extends through the central stile 30. The unit comprises a linkage formed from a plurality of angularly disposed links 44, each link consisting of a channel-shaped bar. The links criss-cross each other as illustrated and are pivotally connected by rivets 46 at spaced intervals therealong intermediate their ends, such pivotal connections extending in horizontal lines intermediate the top and bottom ends of the stiles 12, 14, and 30. The adjacent top and bottom ends of the links 44 are pivotally connected together by rivets 48 and 50, respectively, so that a straight line linkage results.

It will be noted that the bottom overlapped ends are normally disposed between the links 16, 16, 18, 18 when the grille is in extended position as shown in FIG. 1. This arrangement prevents tampering with, bending or otherwise damaging the grille members at the bottom thereof.

While one end of the links 44 is pivotally connected to the adjacent end of the other link of a pair, by means of the rivets 48 and 50, the free ends of the links 44 projecting laterally into the side stiles 12 and 14 are pivotally connected to the web portions of the channel iron 24 of the stiles by the rivets 52.

Figure 2:
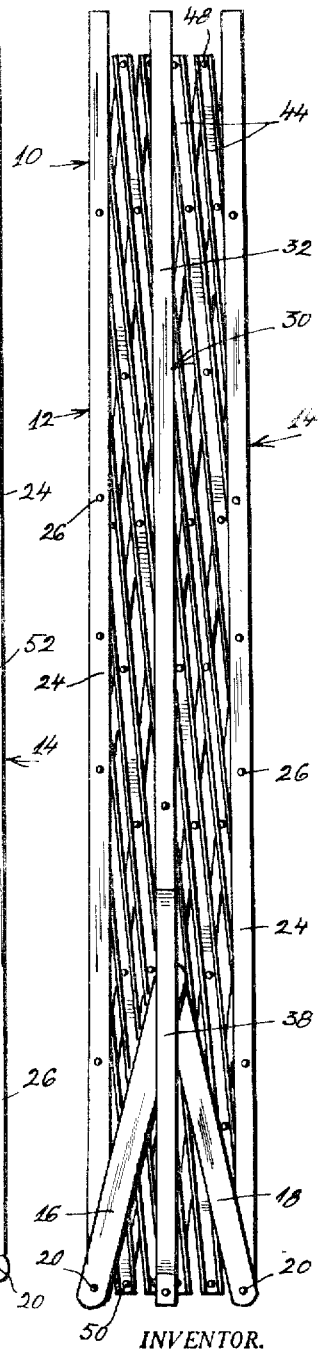
FIGURE 2 is a similar view of the grille in collapsed condition.

In operation, the grille 10 may be adjusted laterally within limits between its normally open position as shown in FIG. 1 and its closed position as shown in FIG. 2 by pushing the side stiles 12 and 14 toward and away from each other. When they are pushed toward each other, the center stile 30 remains in a fixed position while the links 44 are caused to pivot on the pivot pins 46 whereupon the overlapped ends of the links 16 and 18 ride upwardly along the trackway provided in part by the bar portions 38, 38. The links 44 vary their angular relation to each other accordingly. The reverse action takes place upon widening the grille by pushing the side stiles 12 and 14 away from each other.

While I have illustrated and described the preferred embodiment of my invention, it is to be understood that I do not limit myself to the precise construction herein disclosed and that various changes and modifications may be made within the scope of the invention as defined in the appended [claim] *claims.*

What is claimed is:

*1.* A grille of the character described comprising a spaced pair of vertically disposed side stiles and a central intermediate stile; each of said stiles comprising a pair of spaced opposed channel irons connected together at the lower ends thereof, with the side flanges thereof extending inwardly toward each other, by pivot pins which extend through spacer sleeves interposed between opposed channel irons; a pair of guide bars one of which extends upwardly from the lower end of each of the channel irons of said central stile in spaced relation to the outer surface thereof with the upper and lower inturned ends of said guide bars connected to the adjacent channel bar, said guide bars defining a pair of trackways one on each side of said central stile; a lazy-tong grille work composed of a plurality of angularly disposed channel-shaped links arranged back to back with the flanges thereof presented outwardly and pivotally riveted together at their points of crossing and at the upper and lower ends thereof; said grille work extending between said side stiles through said central stile and pivotally connected to each of said side and central stiles; a front pair of longitudinally disposed straight flat bottom links, one of said bottom links having one end thereof pivotally connected to the forward surface of one of said side stiles at the lower end thereof by the pivot pin by which the lower ends of the channel irons of the said one of said side stiles are connected together and the free end thereof disposed within the said trackway on the forward side of said central stile, and the other bottom link of said front pair of bottom links having one end thereof pivotally connected to the forward surface of the other of said side stiles at the lower end thereof by the said pivot pin by which the lower ends of the channel irons of the said other of said side stiles are connected together, and the free end thereof disposed within the said trackway on the forward side of said central stile in overlapping relation with the free end of the said one of said bottom links; a rear pair of longitudinally disposed bottom links which are similarly pivotally connected to the rearward surfaces of the said side stiles in transversely spaced relation to said front pair of bottom links with the free ends thereof disposed in the trackway on the rear side of said central stile in overlapping relation with each other; the overlapping free ends of each pair of bottom links being pivotally connected together and normally resting on lower inturned end of the guide bar defining the associated trackway; the lower inturned ends of said guide bars being disposed above the plane of said pivot pins whereby said bottom links are all inclined slightly upwardly toward said central stile from their pivotal connection with said side stiles; the lower pivotally connected ends of the channel links of said grille work being normally disposed within the space between the said front and rear pairs of bottom links whereby access thereto is prevented.

*2. A grille of the character described comprising a spaced pair of vertically disposed side stiles and a central intermediate stile; each of said stiles comprising a pair of spaced opposed channel irons connected together at the lower ends thereof, with the side flanges thereof extending inwardly toward each other, by pivot pins which extend through spacer sleeves interposed between opposed channel irons; a pair of guide bars one of which extends upwardly from the lower end of each of the channel irons of said central stile in spaced relation to the outer surface thereof with the upper and lower inturned ends of said guide bars connected to the adjacent channel bar, said guide bars defining a pair of trackways, one on each side of said central stile; a lazy-tong grille work composed of a plurality of angularly disposed channel-shaped links arranged back to back with the flanges thereof presented outwardly and pivotally riveted together at their points of crossing and at the upper and lower ends thereof; said grille work extending between said side stiles through said central stile and pivotally connected to each of said side and central stiles; a front pair of longitudinally disposed straight flat bottom links, one of said bottom links, having one end thereof pivotally connected to the forward surface of one of said side stiles at the lower end thereof by the pivot pin by which the lower ends of the channel irons of the said one of said stiles are connected together, and the free end thereof disposed for guidance by the said trackway on the forward side of said central stile, and the other bottom link of said front pair of bottom links having one end thereof pivotally connected to the forward surface of the other of said side stiles at the lower end thereof by said pivot pin by which the lower ends of the channel irons of the said other of said stiles are connected together, and the free end thereof disposed for guidance by the said trackway on the forward side of said central stile; a rear pair of longitudinally disposed bottom links which are similarly pivotally connected to the rearward surface of the said side stiles in transversely spaced relation to said front pair of bottom links, with the free ends thereof disposed for guidance by the trackway on the rear side of said central stile; the lower inturned ends of said guide bars being disposed above the plane of said pivot pins, said bottom links in the lowermost position being inclined slightly upwardly towards said central stile from their pivotal interconnection with said side stiles; the lower pivotally connected ends of the channel links of said grillework being normally disposed within the space between the said front and rear pairs of bottom links, whereby access thereto is prevented.*

References Cited

The following references, cited by the Examiner, are of record in the patented file of this patent or the original patent.

UNITED STATES PATENTS

| | | | |
|---|---|---|---|
| 312,380 | 2/1885 | Pitt | 160—159 X |
| 352,660 | 11/1886 | Pitt | 160—161 |
| 949,739 | 2/1910 | Bataille | 160—163 X |

DAVID J. WILLIAMOWSKY, *Primary Examiner.*

P. M. CAUN, *Assistant Examiner.*